(12) United States Patent
Lee et al.

(10) Patent No.: US 8,537,228 B2
(45) Date of Patent: Sep. 17, 2013

(54) ELECTRONIC DEVICE AND METHOD FOR CONTROLLING CAMERAS

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 350 days.

(21) Appl. No.: 12/820,047

(22) Filed: Jun. 21, 2010

(65) Prior Publication Data

US 2011/0234820 A1 Sep. 29, 2011

(30) Foreign Application Priority Data

Mar. 24, 2010 (TW) .............................. 99108808 A

(51) Int. Cl.
*H04N 5/232* (2006.01)
*H04N 5/222* (2006.01)

(52) U.S. Cl.
USPC .............. 348/211.11; 348/333.01; 348/218.1; 348/153; 725/105

(58) Field of Classification Search
USPC ................. 348/139, 153, 159, 211.11, 218.1, 348/333.01, 333.02, 333.05, 468, 844
See application file for complete search history.

(56) References Cited

U.S. PATENT DOCUMENTS

| | | | | |
|---|---|---|---|---|
| 4,992,866 A | * | 2/1991 | Morgan | 348/159 |
| 5,825,432 A | * | 10/1998 | Yonezawa | 348/563 |
| 6,542,191 B1 | * | 4/2003 | Yonezawa | 348/333.01 |
| 6,888,565 B1 | * | 5/2005 | Tanaka et al. | 348/207.11 |
| 6,973,200 B1 | * | 12/2005 | Tanaka et al. | 382/103 |
| 7,408,137 B2 | * | 8/2008 | Sawachi | 250/208.1 |
| 7,995,096 B1 | * | 8/2011 | Cressy et al. | 348/153 |
| 8,477,227 B2 | * | 7/2013 | Hio | 348/333.01 |
| 2002/0018123 A1 | * | 2/2002 | Suzuki et al. | 348/211 |
| 2006/0010028 A1 | * | 1/2006 | Sorensen | 705/10 |
| 2007/0110039 A1 | * | 5/2007 | Park | 370/352 |
| 2008/0186379 A1 | * | 8/2008 | Ishigame et al. | 348/116 |
| 2009/0174763 A1 | * | 7/2009 | Bengtsson et al. | 348/14.08 |
| 2009/0295918 A1 | * | 12/2009 | Horovitz et al. | 348/143 |
| 2010/0321473 A1 | * | 12/2010 | An | 348/47 |
| 2011/0084915 A1 | * | 4/2011 | Lee et al. | 345/173 |
| 2011/0085042 A1 | * | 4/2011 | Lee et al. | 348/159 |

\* cited by examiner

*Primary Examiner* — Hung Lam
(74) *Attorney, Agent, or Firm* — Altis & Wispro Law Group, Inc.

(57) ABSTRACT

An electronic device and method for controlling a plurality of cameras includes determining a selected camera though a control system, displaying a route map of the selected camera, and calculating motion parameters of a touch motion on a touch panel of the electronic device. The motion parameters are sent to the control system to control the selected camera according to the motion parameters. The touch panel displays acquired video images from the selected camera.

14 Claims, 6 Drawing Sheets

ELECTRONIC DEVICE AND METHOD FOR CONTROLLING CAMERAS

BACKGROUND

1. Technical Field

Embodiments of the present disclosure relate to remote control technology, and more particularly to an electronic device and a method for controlling cameras using the electronic device.

2. Description of Related Art

Currently, cameras are used to perform security surveillance by capturing videos of specified regions. The cameras, such as pan tilt zoom (PTZ) cameras, may be controlled by people through a control system, such as a control operation to move the cameras, or adjust focuses of the cameras, for example. However, the control system is generally installed in a computer server.

Thus, people have to monitor the specified regions by watching the videos through one or more monitor screens connected to the computer server. If people leave the monitor screens, then they cannot watch the videos. That is, the cameras cannot be controlled by people at anywhere.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, Java, C, or Assembly, for example. One or more software instructions in the modules may be embedded in firmware, such as an erasable programmable read only memory (EPROM). It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage system.

Figure 1:
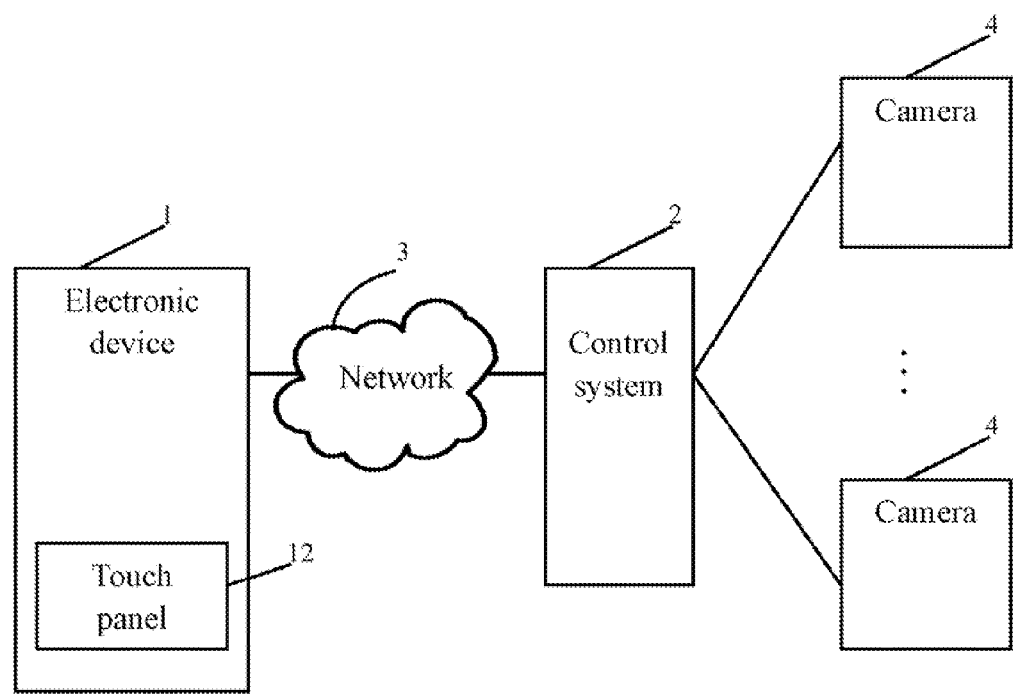
FIG. 1 is a block diagram of some embodiments of an electronic device in communication with a control system.

FIG. 1 is a block diagram of some embodiments of an electronic device 1 in communication with a control system 2. The electronic device 1 is connected to the control system 2 through a network 3. The control system 2 is connected to a plurality of cameras 4, such as pan tilt zoom (PTZ) cameras. In some embodiments, the electronic device 1 may control the cameras 4 through the control system 2, such as to control movement of the cameras 4. Movement of the cameras 4 may include the cameras 4 moving right or left, up or down, or controlling focus or angles of the cameras 4, for example.

The network 3 may be the Internet, an intranet, a WIFI network, a third generation (3G) network, or any other communication network. The cameras 4 may be distributed in different locations to monitor a plurality of specified regions by capturing videos of the specified regions.

In some embodiments, the electronic device 1 may be a mobile phone, a computer, a notebook computer, a personal digital assistant, or any other computing device. The electronic device 1 includes a touch panel 12, through which people may watch the videos captured by the cameras 4. The touch panel 12 may be, but is not limited to, a resistive touch panel or a capacitive touch panel.

Figure 2:
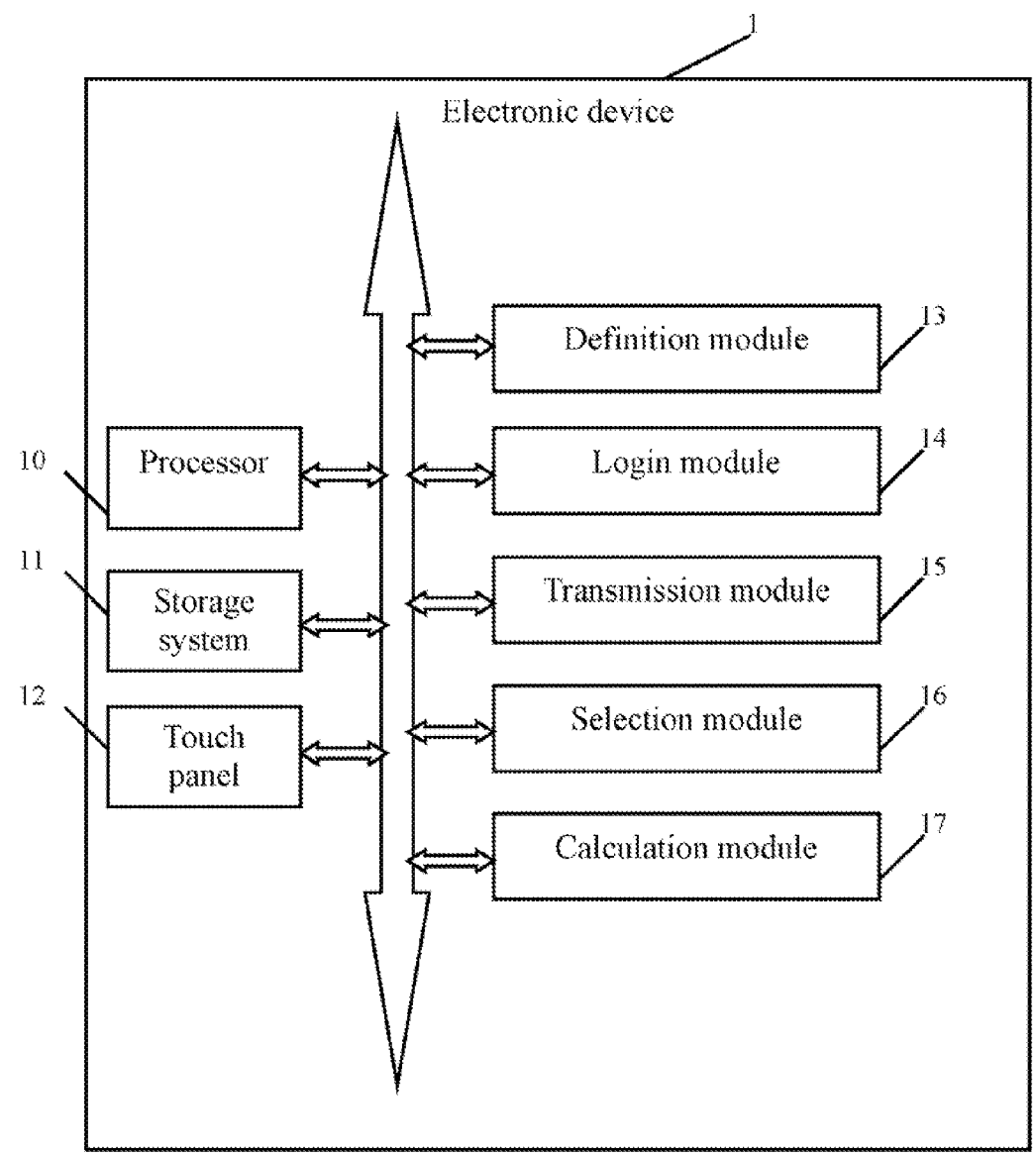
FIG. 2 is a block diagram of some embodiments of the electronic device.

FIG. 2 is a block diagram of some embodiments of the electronic device 1. The electronic device 1 also includes a processor 10 and a storage system 11. The processor 10 executes one or more computerized operations of the electronic device 1 and other applications, to provide functions of the electronic device 1. The storage system 11 stores one or more programs of the electronic device 1, and various kinds of data, such as videos, predefined parameters, for example. In some embodiments, the storage system 11 may include a hard disk drive, a flash memory, a random access memory (RAM), a read-only memory (ROM), a cache, or external storage mediums.

In some embodiments, the electronic device 1 further includes a definition module 13, a login module 14, a transmission module 15, a selection module 16, and a calculation module 17. The modules 13-17 may comprise one or more computerized codes to be executed by the processor 10 to perform one or more operations of the electronic device 1. Details of these operations will be provided below.

The definition module 13 defines a plurality of proportions between touch operations on the touch panel 12 and corresponding control operations of a plurality of cameras 4. The touch operations may include a touch motion, a click action, or any other actions on the touch panel 12. In some embodiments, a proportion may be a relationship between an object A and an object B, for example, if a size of the object A changes, then a size of the object B also changes in a manner dependent on the change of the object A. Detailed descriptions about the proportions will be provided below.

The electronic device 1 connects to the control system 2 through the network 3 using the login module 14. The login module 14 may verify an identification of a user by determining if an input username and password of the user are valid according to a predetermined username and password. If the input username and password of the user are valid, that is, the identification of the user is valid, and then the electronic device 1 logs in the control system 2.

Figure 3:
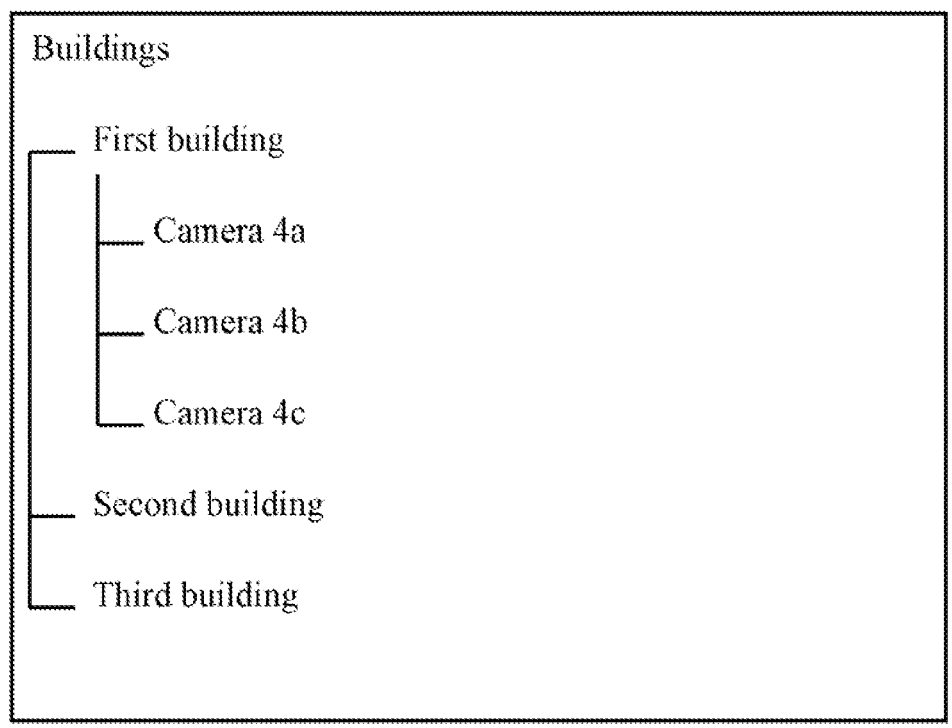
FIG. 3 is a schematic diagram of some embodiments of a list of cameras.

The transmission module 15 receives camera information of the cameras 4 from the control system 2, and displays the camera information on the touch panel 12. In some embodiments, the camera information may include names or serial numbers of the cameras 4, and locations of the cameras 4. As shown in FIG. 3, a list including the camera information is displayed on the touch panel 12. In the list, it can be seen that a specific building corresponds to specified cameras 4. For example, a building A has three cameras 4: a camera 4A, a camera 4B, and a camera 4C. The cameras 4A, 4B, and 4C may be fixed on different locations of the building A, to monitor an environment around the building A, an environment in the building A, and/or other environments that need to be monitored.

The user may select one of the cameras 4 from the list displayed on the touch panel 12. The selection module 16 determines a selected camera 4 from the cameras 4 though the control system 2 in response to a selection made by the user.

Figure 4:
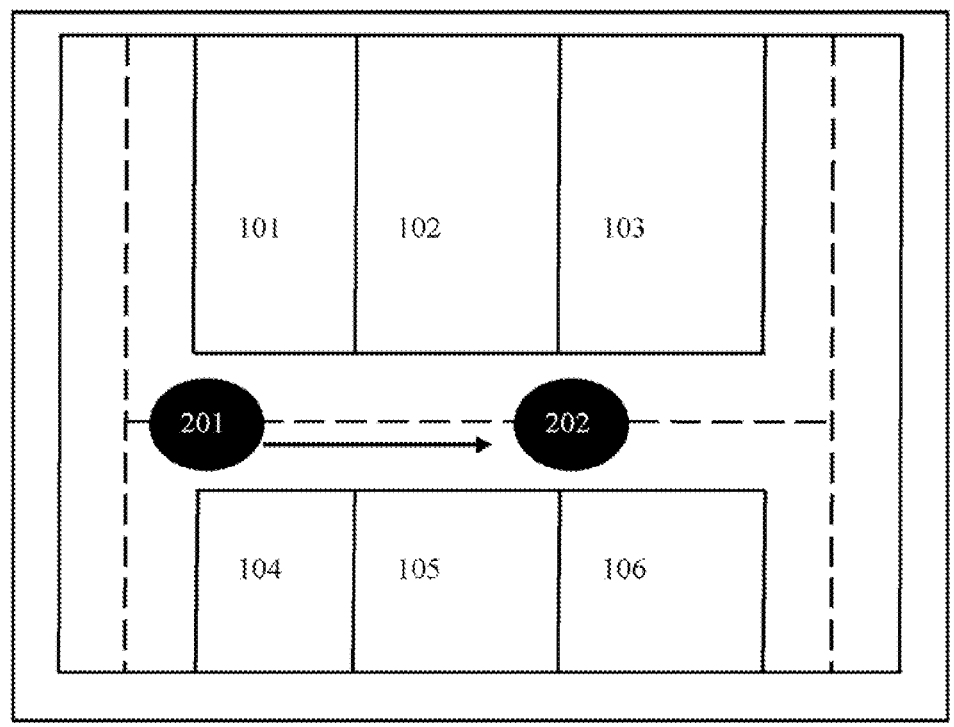
FIG. 4 is a schematic diagram of an embodiment of a route map of a selected camera.

The transmission module 15 receives a route map of the selected camera 4 from the control system 2, and displays the route map on the touch panel 12. In some embodiments, a schematic diagram of the route map of the selected camera 4 is shown in FIG. 4. In the route map, broken lines represents routes of the selected camera 4, and a left dot 201 represents the selected camera 4 located at a start position. In some embodiments, the user may perform a touch motion on the route map by clicking the left dot 201, and dragging the left dot 201 to another position. For example, a right dot 202 represents that the selected camera 4 located at an end position.

The calculation module 17 detects a touch motion on the route map through the touch panel 12, and calculates motion parameters of the touch motion. In some embodiments, the motion parameters may include, but are not limited to, a distance and a direction of the touch motion. Specifically, the calculation module 17 constructs a coordinate system on the route map, and detects start coordinates (e.g., coordinates of the left dot 201 shown in FIG. 4) and end coordinates (e.g., coordinates of the right dot 202 shown in FIG. 4) of the touch motion on the route map. The calculation module 17 calculates the distance and the direction of the touch motion according to the start coordinates and the end coordinates.

In some embodiments, the definition module 13 may define a first proportion between the route map and an actual route of the selected camera 4. The first proportion is a relationship between the route map and the actual route of the selected camera 4. For example, the first proportion is 1/100. If the selected camera 4 displayed on the touch panel 12 is moved 2 centimeters on the route map, then the selected camera 4 on the actual route may move 2 meters. The calculation module 17 calculates the motion parameters according to the first proportion, the distance and the direction of the touch motion. In another embodiment, the calculation module 17 may construct the coordinate system based on the touch panel 12.

The transmission module 15 sends the motion parameters to the control system 2 to control the selected camera 4 according to the motion parameters, and acquires video images from the selected camera 4 through the control system 2. Then the transmission module 15 displays the video images on the touch panel 12.

The transmission module 15 may further displays the route map of the selected camera 4 and the video images on the touch panel 12 simultaneously, so that the user may control the selected camera 4 to monitor a specific region based on the video images currently displayed on the touch panel 12. For example, the video images show a hallway of a building. If the user wants to see a corner at the end of the hallway, the user may control the selected camera 4 to move to the corner until the video images show a desire region.

Figure 5:
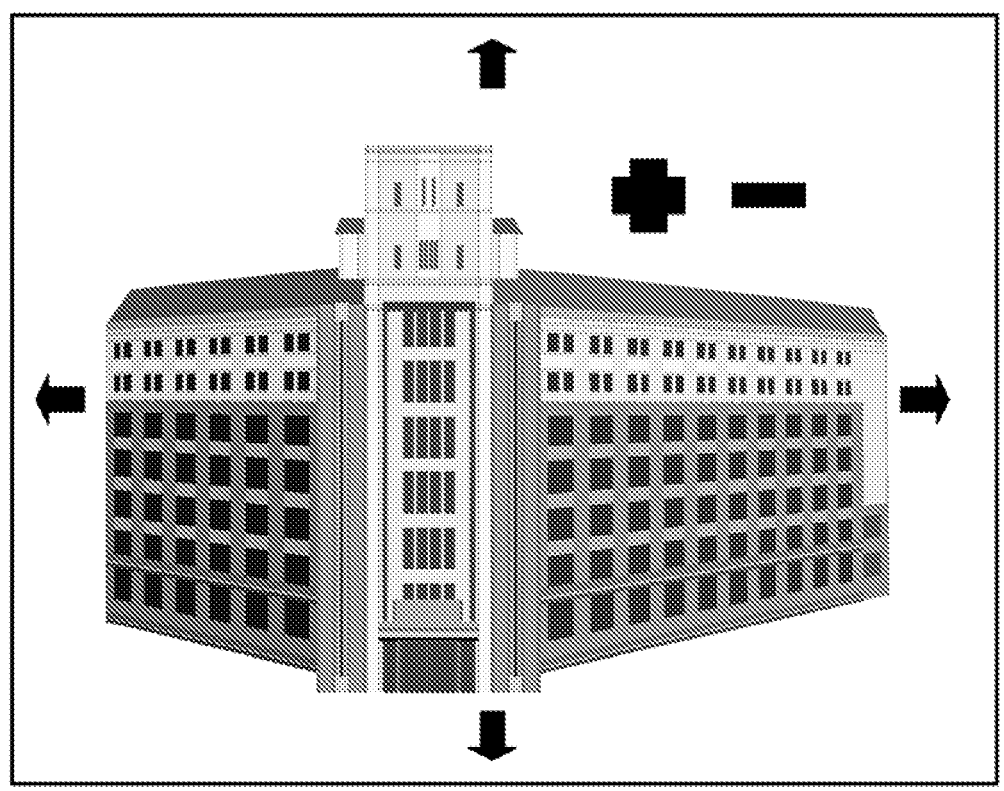
FIG. 5 is a schematic diagram of some embodiments of video images acquired from the selected camera.

The definition module 13 further sets a plurality of function icons to adjust the video images. Referred to FIG. 5, the function icons may include a function icon of resizing the video images to adjust a focus of the selected camera 4 (e.g., "+" and "−" as shown in FIG. 5), a function icon of adjusting an angle of the video images to adjust an angle of the selected camera 4 (e.g., four direction arrows as shown in FIG. 5), and a function icon of sync displaying the video images and the route map on the touch panel 12 (not shown in FIG. 5). The function icons are displayed on the touch panel 12 when the touch panel 12 displays the video images, and the calculation module 17 executes functions corresponding to the function icons. Detailed descriptions are provided as below.

The calculation module 17 may resize the video images displayed on the touch panel 12 to adjust the focus of the selected camera 4. The definition module 13 defines a second proportion between an image size of the video images displayed on the touch panel 12 and the focus of the selected camera 4.

The calculation module 17 detects a size variable of the video images in response to a resizing operation of the user, and calculates a focus variable of the selected camera 4 according to the size variable and the second proportion. For example, the user may click the "+" function icon to increase the size of the video images, and then further the focus of the selected camera 4 is adjusted according to the size variable and the second proportion correspondingly.

The transmission module 15 sends the focus variable of the selected camera 4 to the control system 2 to adjust the focus of the selected camera 4. After the focus of the selected camera 4 is adjusted, the video images displayed on the touch panel 4 are magnified correspondingly.

The calculation module 17 may further adjust the angle of the video images to control the angle of the selected camera 4. The definition module 13 defines a third proportion between an angle of the video images and an angle of the selected camera 4. The calculation module detects an angle variable of the video images, and calculates an angle variable of the selected camera 4 according to the angle variable of the video images and the third proportion.

The transmission module 15 sends the angle variable of the selected camera 4 to the control system 2 to control the angle of the selected camera 4. The transmission module 15 further acquire adjusted video images from the selected camera 4, and displays the adjusted video images on the touch panel 12.

Figure 6:
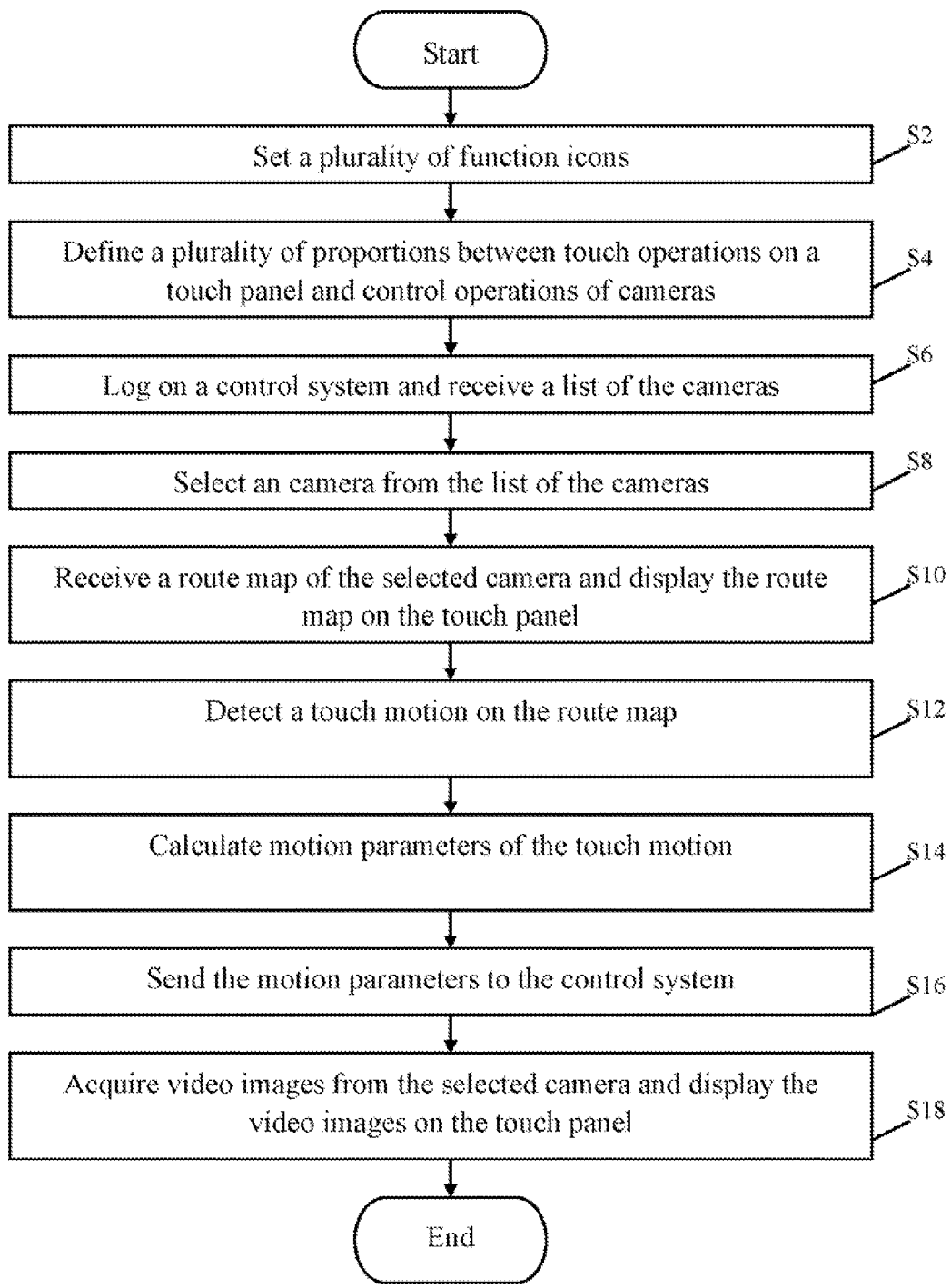
FIG. 6 is a flowchart of a first embodiment of a method for controlling the cameras using the electronic device of FIG. 2.

FIG. 6 is a flowchart of a first embodiment of a method for controlling cameras 4 using the electronic device 1 of FIG. 2. Depending on the embodiment, additional blocks may be added, others removed, and the ordering of the blocks may be replaced.

In block S2, the definition module 13 sets a plurality of function icons to adjust video images.

In block S4, the definition module 13 defines a plurality of proportions between touch operations on a touch panel 12 and control operations of the cameras 4. Detailed descriptions are provided below.

In block S6, the electronic device 1 logs on a control system 2 through the network 3 using the login module 14, and the transmission module 15 receives a list of the cameras 4 from the control system 2. The transmission module 15 further displays the list of the cameras 4 on the touch panel 12. The list includes camera information of the cameras 4, such as names or serial numbers of the cameras 4, and locations of the cameras 4.

In block S8, the selection module 16 determines a selected camera 4 from the cameras 4 though the control system 2 in response to a selection of a user.

In block S10, the transmission module 15 receives a route map of the selected camera 4 from the control system 2, and displays the route map on the touch panel 12.

In block S12, the calculation module 17 detects a touch motion on the route map through the touch panel 12. In some embodiments, the calculation module 17 constructs a coordinate system on the route map, and detects start coordinates and end coordinates of the touch motion on the route map.

In block S14, the calculation module 17 calculates motion parameters of the touch motion. As mentioned above, the motion parameters may include, but are not limited to, a distance and a direction of the touch motion. Specifically, the definition module 13 may define a first proportion between the route map and an actual route of the selected camera 4. Then the calculation module 17 calculates the motion parameters according to the first proportion, the distance and the direction of the touch motion.

In block S16, the transmission module 15 sends the motion parameters to the control system 2 to control the selected camera 4 move to a desired location according to the motion parameters.

In block S18, the transmission module 15 acquires video images from the selected camera 4 through the control system 2, and displays the video images on the touch panel 12.

Figure 7:
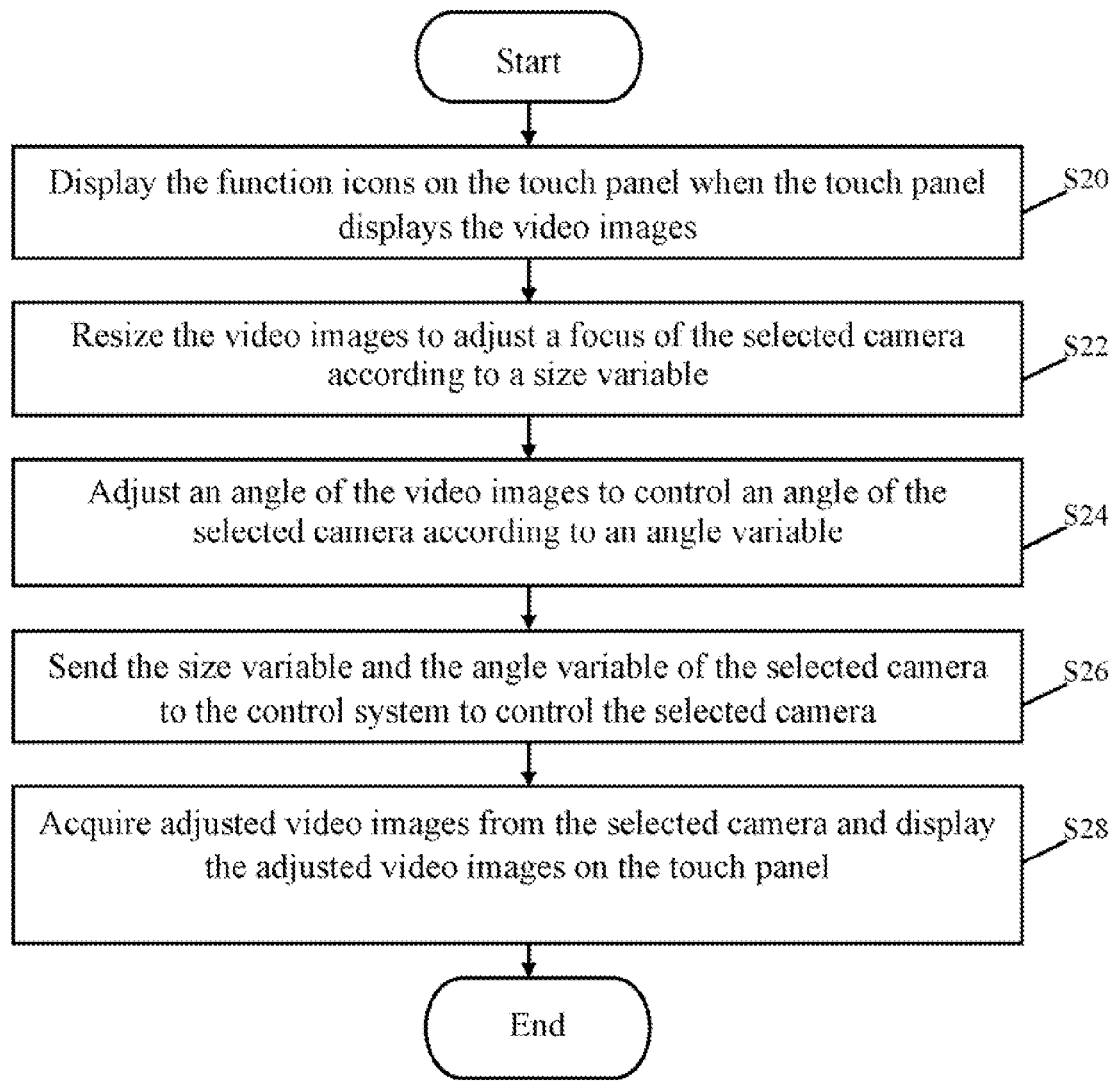
FIG. 7 is a flowchart of a second embodiment of a method for controlling the cameras using the electronic device of FIG. 2.

FIG. 7 is a flowchart of a second embodiment of a method for controlling cameras 4 using the electronic device 1 of FIG. 2. Depending on the embodiment, additional blocks may be added, others removed, and the ordering of the blocks may be replaced.

In block S20, the definition module 13 displays the function icons on the touch panel 12 when the touch panel 12 displays the video images.

In block S22, the calculation module 17 resizes the video images displayed on the touch panel 12 to adjust a focus of the selected camera 4. As mentioned above, the definition module 13 defines a second proportion between an image size of the video images and the focus of the selected camera 4. The calculation module 17 detects a size variable of the video images in response to a resizing operation of the user, and calculates a focus variable of the selected camera 4 according to the size variable and the second proportion.

In block S24, the calculation module 17 adjusts an angle of the video images to control an angle of the selected camera 4. Specifically, the definition module 13 defines a third proportion between an angle of the video images and an angle of the selected camera 4. The calculation module detects an angle variable of the video images, and calculates an angle variable of the selected camera 4 according to the angle variable of the video images and the third proportion.

In block S26, the transmission module 15 sends the size variable and the angle variable of the selected camera 4 to the control system 2, to control the focus and the angle of the selected camera 4.

In block S28, the transmission module 15 acquire adjusted video images from the selected camera 4, and displays the adjusted video images on the touch panel 12.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for controlling a plurality of cameras using an electronic device, the electronic device in communication with a control system that controls the plurality of cameras, the method comprising:
   determining a selected camera from the plurality of cameras though the control system;
   receiving a route map of the selected camera from the control system, and displaying the route map on a touch panel of the electronic device;
   detecting a touch motion on the route map through the touch panel;
   calculating motion parameters of the touch motion, the motion parameters comprising a distance and a direction of the touch motion;
   sending the motion parameters to the control system to control movement of the selected camera according to the motion parameters; and
   acquiring video images from the selected camera through the control system, and displaying the video images on the touch panel.

2. The method according to claim 1, wherein the calculating step comprises:
   constructing a coordinate system, the coordinate system being based on the route map or the touch panel;
   detecting start coordinates and end coordinates of the touch motion on the route map; and
   calculating the distance and the direction of the touch motion according to the start coordinates and the end coordinates.

3. The method according to claim 2, wherein the calculating step further comprises:
   defining a first proportion between the route map and an actual route of the selected camera; and
   calculating the motion parameters according to the first proportion, the distance and the direction of the touch motion.

4. An electronic device, the electronic device in communication with a control system that controls a plurality of cameras, the electronic device comprising:
   a storage system;
   at least one processor; and
   one or more programs stored in the storage system and being executable by the at least one processor, the one or more programs comprising:
   a selection module that determines a selected camera from the plurality of cameras though the control system;
   a transmission module that receives a route map of the selected camera from the control system, and displays the route map on a touch panel of the electronic device;
   a calculation module that detects a touch motion on the route map through the touch panel, and calculates motion parameters of the touch motion, the motion parameters comprising a distance and a direction of the touch motion; and
   the transmission module that sends the motion parameters to the control system to control movement of the selected camera according to the motion parameters, acquires video images from the selected camera through the control system, and displays the video images on the touch panel.

5. The electronic device according to claim 4, wherein the calculation module calculates the motion parameters by:
   constructing a coordinate system, the coordinate system being based on the route map or the touch panel;
   detecting start coordinates and end coordinates of the touch motion on the route map; and
   calculating the distance and the direction of the touch motion according to the start coordinates and the end coordinates.

6. The electronic device according to claim 5, wherein the one or more programs further comprises a definition module:
   the definition module defines a first proportion between the route map and an actual route of the selected camera; and
   the calculation module calculates the motion parameters according to the first proportion, the distance and the direction of the touch motion.

7. A non-transitory storage medium storing a set of instructions, the set of instructions capable of being executed by a processor to perform a method for controlling a plurality of cameras using an electronic device, the electronic device in communication with a control system that controls the cameras, the method comprising:

determining a selected camera from the plurality of cameras though the control system;

receiving a route map of the selected camera from the control system, and displaying the route map on a touch panel of the electronic device;

detecting a touch motion on the route map through the touch panel;

calculating motion parameters of the touch motion, the motion parameters comprising a distance and a direction of the touch motion;

sending the motion parameters to the control system to control movement of the selected camera according to the motion parameters; and acquiring video images from the selected camera through the control system, and displaying the video images on the touch panel.

8. The non-transitory storage medium as claimed in claim 7, wherein the calculating step comprises:

defining a first proportion between the route map and an actual route of the selected camera;

constructing a coordinate system, the coordinate system being based on the route map or the touch panel;

detecting start coordinates and end coordinates of the touch motion on the route map;

calculating the distance and the direction of the touch motion according to the start coordinates and the end coordinates; and calculating the motion parameters according to the first proportion, the distance and the direction of the touch motion.

9. The method according to claim 1, further comprising:

receiving a list of the plurality of cameras from the control system when the electronic device logs on the control system, the list comprising camera information and locations of the plurality of cameras; and displaying the list of the cameras on the touch panel.

10. The method according to claim 1, wherein the route map of the selected camera and the video images acquired from the selected camera are displayed on the touch panel simultaneously.

11. The electronic device according to claim 4, wherein the transmission module receives a list of the plurality of cameras from the control system when the electronic device logs on the control system, and displays the list of the cameras on the touch panel, the list comprising camera information and locations of the plurality of cameras.

12. The electronic device according to claim 4, wherein the transmission module displays the route map of the selected camera and the video images acquired from the selected camera on the touch panel simultaneously.

13. The non-transitory storage medium as claimed in claim 7, wherein the method further comprises:

receiving a list of the plurality of cameras from the control system when the electronic device logs on the control system, the list comprising camera information and locations of the plurality of cameras; and displaying the list of the cameras on the touch panel.

14. The non-transitory storage medium as claimed in claim 7, wherein the route map of the selected camera and the video images acquired from the selected camera are displayed on the touch panel simultaneously.

\* \* \* \* \*